United States Patent [19]

Molnar et al.

[11] Patent Number: 4,817,910
[45] Date of Patent: Apr. 4, 1989

[54] RETAINING SYSTEM, IN PARTICULAR FOR RETAINING BUNDLES OF WIRES IN A TELEPHONE EXCHANGE

[75] Inventors: Geza Molnar, Aiglemont; Claude Yapoudjian, Morangis, both of France

[73] Assignee: Mars Actel, Vrigne aux Bois, France

[21] Appl. No.: 77,720

[22] Filed: Jul. 27, 1987

[30] Foreign Application Priority Data

Jul. 25, 1986 [FR] France .................................. 86 10808

[51] Int. Cl.⁴ .............................................. F16L 3/22
[52] U.S. Cl. ...................................... 248/68.1; 248/73
[58] Field of Search ................... 248/68.1, 74.4, 67.7, 248/67.5, 73; 174/155, 156, 157; 24/576, 616, 617, 115 G

[56] References Cited

U.S. PATENT DOCUMENTS

| | | | |
|---|---|---|---|
| 2,937,835 | 5/1960 | Csmereka | 248/68.1 X |
| 3,279,014 | 10/1966 | Fischer | 248/68.1 X |
| 4,118,838 | 10/1978 | Schiefer | 248/68.1 X |
| 4,219,694 | 8/1980 | Schulte | 174/156 |
| 4,660,790 | 4/1987 | Muz | 174/156 X |

FOREIGN PATENT DOCUMENTS

| | | | |
|---|---|---|---|
| 4998 | 9/1955 | Fed. Rep. of Germany | 248/68.1 |
| 2315485 | 10/1973 | Fed. Rep. of Germany | . |
| 2431834 | 1/1976 | Fed. Rep. of Germany | 248/68.1 |
| 2658296 | 3/1978 | Fed. Rep. of Germany | . |
| 1311393 | 10/1962 | France | 248/68.1 |

OTHER PUBLICATIONS

IBM Technical Disclosure Bulletin, vol. 27, No. 7A, Dec. 1984, pp. 3798-3799.

Primary Examiner—J. Franklin Foss
Attorney, Agent, or Firm—Sughrue, Mion, Zinn, Macpeak, and Seas

[57] ABSTRACT

A retaining system, in particular for retaining bundles of wires in a telephone exchange, comprises successive stages (E1, E2) each constituted by a hook (B2, S2, 18, 20) which, together with the hook (22) of an adjacent stage (E1) constitutes a loop suitable, for example, for retaining a bundle of electric wires. The first stage (E1) is provided with fixing means (W) for fixing it to a supporting structure. Each subsequent stage (E2) is connected to the preceding stage (E1) by a link rod (T1) which is snap-fastened in housings (L1, L2) in each stage. The invention is applicable to telephone exchanges.

6 Claims, 2 Drawing Sheets

RETAINING SYSTEM, IN PARTICULAR FOR RETAINING BUNDLES OF WIRES IN A TELEPHONE EXCHANGE

The invention relates to a retaining system, in particular for retaining bundles of wires in a telephone exchange.

Such a system is intended more generally for maintaining a plurality of objects in position relative to a supporting structure.

BACKGROUND OF THE INVENTION

This supporting structure may be constituted, for example, by a vertical aluminum bar having a retaining groove of T-shaped section for receiving a plurality of fixing means disposed at different heights above the ground. Prior retaining systems are known which comprise:

a stack of retaining stages following one another in a stacking direction and each extending along a longitudinal direction and along a lateral direction;

each of said stages including retaining means for receivig one of said objects to be retained;

a first stage being provided with fixing means for fixing it to said supporting structure; and each subsequent stage being provided with link means for linking it to the preceding stage.

In these prior systems, the means linking successive stages are constituted by screws. It therefore takes considerable time to build a stack, and a screwdriver must be available. A very wide range of fixing means are available for fixing the first stage to the supporting structure.

The aim of the present invention is to make stacking simpler and quicker than before, at least when the loads supported by the stack when in use remain moderate.

SUMMARY OF THE INVENTION

According to the invention each of said stages comprises a link block extending from a base face to a top face along said stacking direction in such a manner that the base face of each succeeding stage bears against the top face of the preceding stage;

at least each non-end stage being provided with a link rod extending along said stacking direction and projecting from said base face and/or from said top face;

at least each non-end stage including a link housing extending within its link block from said top face and-/or from said base face in order to receive and contain the link rod projecting from the base face and/or from the top face of the succeeding stage and/or from the preceding stage, in such a manner as to prevent each stage from sloping relative to the other stages at least by rotation about the axes of said longitudinal and lateral directions;

snap-fastening projections being provided along one of said lateral or longitudinal directions on said link rod or in said housing, said projections being resiliently retractable in order to enable said link rod to be inserted in said link housing; and snap-fastening housing being provided in the walls of said link housing or of said link rod in order to receive said snap-fastening projections when said rod is pushed home into said link housing with the base and top faces of consecutive stages coming into contact so as to oppose separation of said two stages.

BRIEF DESCRIPTION OF THE DRAWINGS

A non-limiting example of how the invention may be implemented is described below with reference to the accompanying diagrammatic figures. It should be understood that the items described and shown may, without going beyond the scope of the invention, be replaced by other items providing the same technical functions. When the same item is shown in several figures, it is designated therein by the same reference symbol.

MORE DETAILED DESCRIPTION

Figure 1:
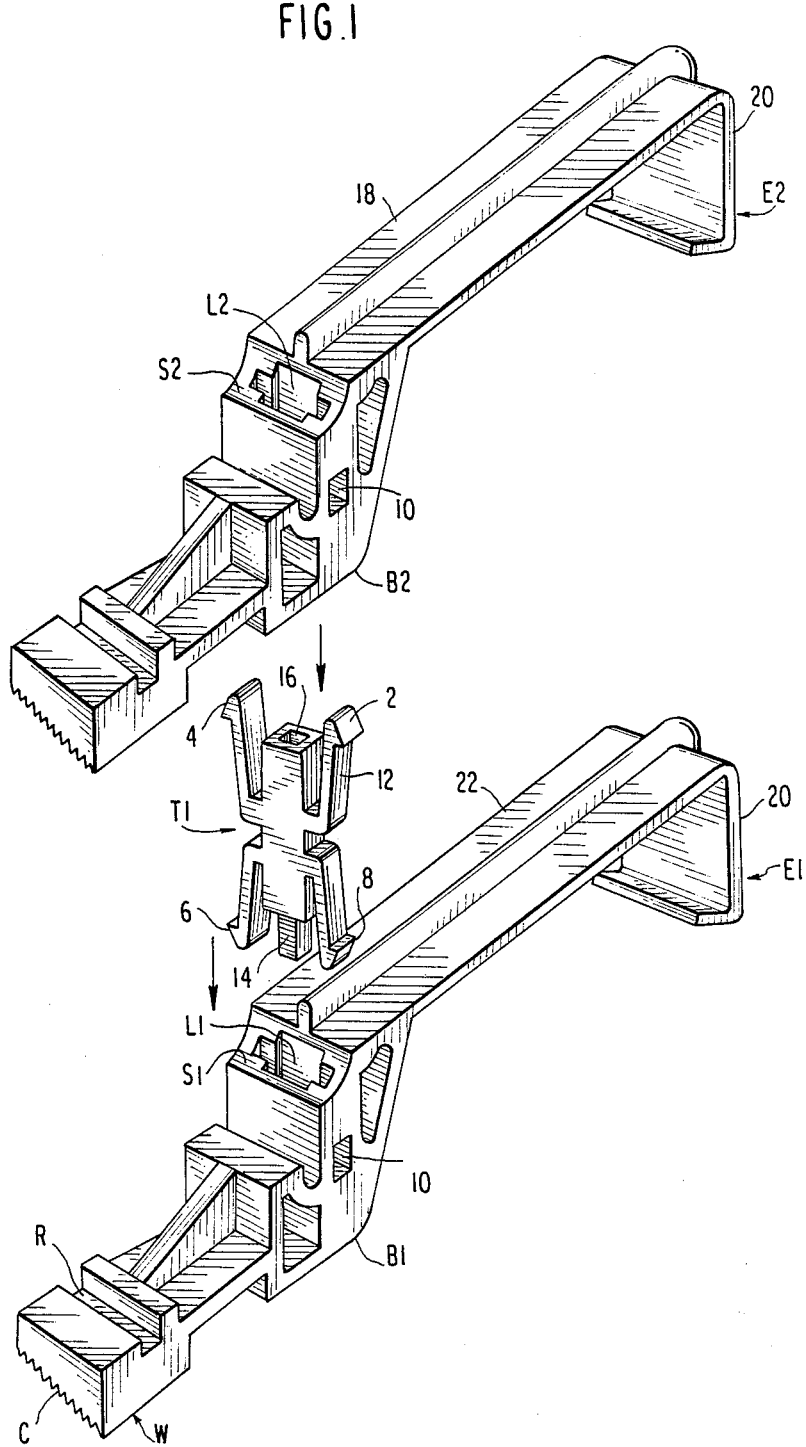
FIG. 1 is an exploded, perspective view of two successive stages of a system in accordance with the invention showing the system in the course of assembly.
Figure 2:
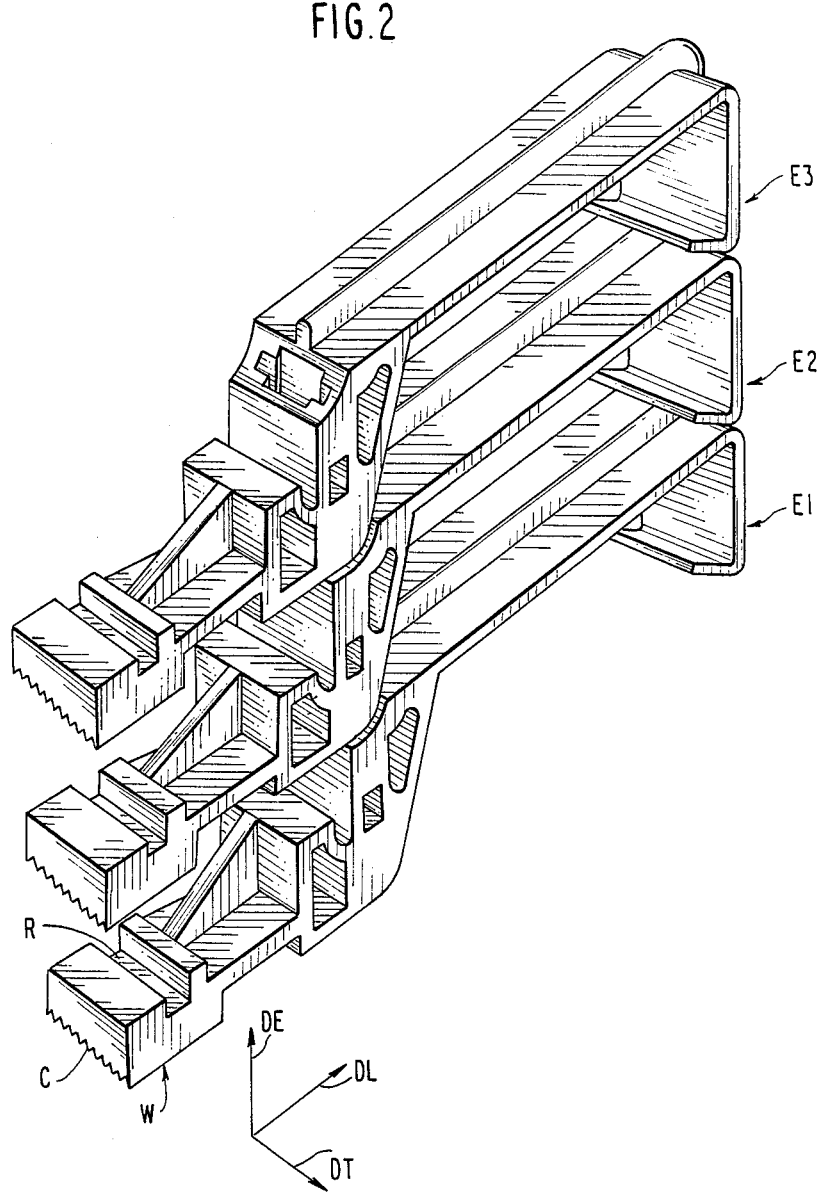
FIG. 2 is a fragmentary perspective view of the same system in use, with the supporting structure for the first stage and some of the fixing means being omitted.

In the system described by way of example, the various stages (E1, E2, E3) are identical in order to facilitate fabrication.

The supporting structure for the first stage E1 is not shown. It is constituted by a bar extending in a direction DT and having a T-shaped groove. The first stage is fixed thereto by means of a pair of identical wedging shoes.

Only one of these shoes W is shown. It forms an integrally molded portion of the stage E1. It has a groove R in which one of the lips of the groove in the bar is received.

The face C on the opposite said to said groove is inclined, i.e. the thickness of material beneath the groove increases coming towards the observer along the direction DT.

The groove in the other shoe (not shown) engages the other lip of the bar and the inclined faces of the two shoes press against each other. By pushing the shoe which is not shown against the shoe W along direction DT, these two inclined surfaces are slid over each other and the two-shoe assembly is wedged in compression between the two lips of the bar.

Naturally, other conventional fixing means could be used.

In accordance with the invention, as mentioned above, and as shown in the figures, each of said stages comprises a link block extending from a base face to a top face along said stacking direction in such a manner that the base face of each succeeding stage bears against the top face of the preceding stage.

Each non-end stage is provided with a link rod extending along said stacking direction and projecting from said base face and/or from said top face;

Similarly, each non-end stage includes a link housing extending within its link block from said top face and-/or from said base face in order to receive and contain the link rod projecting from the base face and/or from the top face of the succeeding stage and/or from the preceding stage; thereby preventing each stage from sloping relative to the other stages at least by rotation about the axes of said longitudinal and lateral directions.

Snap-fastening projections are provided along one of said lateral or longitudinal directions on said link rod or in said housing, and said projections are resiliently retractable in order to enable said link rod to be inserted in said link housing.

Snap-fastening housings are provided in the walls of said link housing or of said link rod in order to receive said snap-fastening projections when said rod is pushed home into said link housing with the base and top faces of consecutive stages coming into contact so as to oppose separation of said two stages.

More particularly, the link pins are separable from the stages and include the snap-fastening projections. Each of the pins (T1) comprises, at each of its ends, a pair of oppositely-directed snap-fastening projections, and each link housing (L1) is in the form of a link channel passing through the block in the stacking direction, with a portion of the length of said channel running from the base face constituting a link housing for a link rod coming from a preceding stage. A portion of the length of the channel (L1) running from the top face (S1) constitutes a link housing for a link rod (T1) coming from a subsequent stage (E2). The link block (B1, S1) has a snap-fastening channel (10) running through an intermediate zone thereof disposed between its base face (B1) and its top face (S1); this channel runs along a direction (DT) extending transversely to the stacking direction (DE) and intersects the link channel (L1) to constitute snap-fastening housings therein.

The link pin (T1) and the link housing (L1, L2) preferably have complementary polygonal sections so as to oppose rotation of a stage (E2) about an axis parallel to the stacking direction (DE).

More precisely, and as shown, the link pin (T1) has a substantially square cross-section and bears a pair of oppositely-directed snap-fastening projections (2, 4) at at least one of its ends.

Each projection (2) is carried on the end of a flexible arm (12) which extends in the stacking direction (DE) from a lengthwise middle region of the pin and is fixed to the pin in said middle region in such a manner as to allow the projection to be retracted resiliently. Each link pin (T1) is provided at one of its ends with an axial extension (14) of reduced transverse dimensions and it has an axial bore (16) at its opposite end in order to receive the axial extension from an adjacent link pin.

In accordance with the invention, the retaining means of each stage (E2) is in the form of an elongate hook (B2, S2, 18, 20). This hook comprises a hook beam (18) extending along the longitudinal direction (DL) from one end (S2) of the link block (B2, S2), and a hook closure arm (20) extending from the end of said beam in the stacking direction so as to face the length of the link block in such a manner that the stack of said stages (E1, E2) forms a succession of closed retaining loops. Each loop (B2, S2, 18, 20, 22) is constituted by the link block (B2, S2), the hook beam (18), and the hook closure loop (20) of one stage (E2) followed by the hook beam (22) of an adjacent stage (E1).

The shoe W, i.e., the fixing means (W) of the first stage (E1), supports said first stage via the link block (B1, S1) thereof.

The system is preferably made of molded or injected plastic material such as a polyamide.

We claim:

1. A retaining system, in particular for retaining bundles of wires in a telephone exchange, said system being intended more generally for maintaining a plurality of objects in position relative to a supporting structure, and comprising:
    a stack of retaining stages following one another in a stacking direction and each extending along a longitudinal direction and along a lateral direction;
    each of said stages including retaining means for receiving one of said objects to be retained;
    a first stage being provided with fixing means for fixing it to said supporting structure; and
    each subsequent stage being provided with link means for linking it to the preceding stage;
    said system including the improvements whereby each of said stages comprises a link block extending from a base face to a top face along said stacking direction in such a manner that the base face of each succeeding stage bears against the top face of the preceding stage;
    at least each non-end stage is provided with a link rod extending along said stacking direction and projecting from said base face and/or from said top face;
    at least each non-end stage includes a link housing extending within its link block from said top face and/or from said base face in order to receive and contain the link rod projecting from the base face and/or from the top face of the succeeding stage and/or from the preceding stage, in such a manner as to prevent each stage from sloping relative to the other stages at least by rotation about the axes of said longitudinal and lateral directions;
    snap-fastening projections are provided along one of said lateral or longitudinal directions on said link rod or in said housing, said projections being resiliently retractable in order to enable said link rod to be inserted in said link housing;
    snap-fastening housings are provided in the walls of said link housing or of said link rod in order to receive said snap-fastening projections when said rod is pushed home into said link housing with the base and top faces of consecutive stages coming into contact so as to oppose separation of said two stages;
    said link rods are separable from said stages and include said snap-fastening projections, with each of said rods including a pair of oppositely-directed snap-fastening projections at each of its ends, each of said link housings being in the form of a link channel passing through said block along said stacking direction, a portion of the length of said channel running from said base face constituting one of said link housings for a link rod coming from a preceding state, and a portion of the length of said channel running from said top face constituting one of said link housings for a link rod coming from a succeeding stage.

2. A system according to claim 1, wherein said link block has a snap-fastening channel passing through a middle zone thereof between said base and top faces, said snap-fastening channel extending along a direction which is transverse to said stacking direction and which intersects said link channel in order to constitute said snap-fitting housings for said link channel.

3. A system according to claim 1, wherein each of said link rods is provided at one of its ends with an axial extension of smaller cross-sectional size, and has an axial bore at its other end suitable for receiving the axial extension of an adjacent link rod.

4. A retaining system in particular for retaining bundles of wires in a telephone exchange, said system being intended more generally for maintaining a plurality of objects in position relative to a supporting structure, and comprising:
    a stack of retaining stages following one another in a stacking direction and each extending along a longitudinal direction and along a lateral direction;

each of said stages including retaining means for receiving one of said objects to be retained;
a first stage being provided with fixing means for fixing it to said supporting structure; and
each subsequent stage being provided with link means for linking it to the preceding stage;
said system including the improvements whereby each of said stages comprises a link block extending from a base face to a top face along said stacking direction in such a manner that the base face of each succeeding stage bears against the top face of the preceding stage;
at least each non-end stage is provided with a link rod extending along said stacking direction and projecting from said base face and/or from said top face;
at least each non-end stage includes a link housing extending within its link block from said top face and/or from said base face in order to receive and contain the link rod projecting from the base face and/or from the top face of the succeeding stage and/or from the preceding stage, in such a manner as to prevent each stage from sloping relative to the other stages at least by rotation about the axes of said longitudinal and lateral directions;
snap-fastening projections are provided along one of said lateral or longitudinal directions on said link rod or in said housing, said projections being resiliently retractable in order to enable said link rod to be inserted in said link housing;
snap-fastening housings are provided in the walls of said link housing or of said link rod in order to receive said snap-fastening projections when said rod is pushed home into said link housing with the base and top faces of consecutive stages coming into contact so as to oppose separtion of said two stages; and
said rod and said link housing having complementary polygonal cross-sections so as to oppose the rotation of a stage about an axis parallel to said stacking direction.

5. A system according to claim 4, wherein said link rod is of substantially square section and bears a pair of oppositely-directed snap-fastening projections at at least one of its ends, each projection being carried at the end of a flexible arm which extends along said stacking direction from a length-wise middle zone of said rod and which is fixed to said rod in said middle zone, in such a manner as to enable said projection to be resiliently retracted.

6. A retaining system in particular for retaining bundles of wires in a telephone exchange, said system being intended more generally for maintaining a plurality of objects in position relative to a supporting structure, and comprising:
a stack of retaining stages following one another in a stacking direction and each extending along a longitudinal direction and along a lateral direction;
each of said stages including retaining means for receiving one of said objects to be retained;
a first stage being provided with fixing means for fixing it to said supporting structure; and
each subsequent stage being provided with link means for linking it to the preceding stage;
said system including the improvements whereby each of said stages comprises a link block extending from a base face to a top face along said stacking direction in such a manner that the base face of each succeeding stage bears against the top face of the preceding stage;
at least each non-end stage is provided with a link rod extending along said stacking direction and projecting from said base face and/or from said top face;
at least each non-end stage includes a link housing extending within its link block from said top face and/or from said base face in order to receive and contain the link rod projecting from the base face and/or from the top face of the succeeding stage and/or from the preceding stage, in such a manner as to prevent each stage from sloping relative to the other stages at least by rotation about the axes of said longitudinal and lateral directions;
snap-fastening projections are provided along one of said lateral or longitudinal directions on said link rod or in said housing, said projections being resiliently retractable in order to enable said link rod to be inserted in said link housing;
snap-fastening housings are provided in the walls of said link housing or of said link rod in order to receive said snap-fastening projections when said rod is pushed home into said link housing with the base and top faces of consecutive stages coming into contact so as to oppose separation of said two stages;
the retaining means of each stage being in the form of an elongate hook comprising a hook beam extending along said longitudinal direction from one end of said link block, and a hook closure arm extending from the end of said beam along said stacking direction and facing the length of said link block in such a manner that a stack of said stages forms a succession of closed retaining loops, with each loop being formed by the link block, the hook beam and the hook closure arm of one stage and by the hook beam of an adjacent stage.

* * * * *